Dec. 10, 1935.   J. KREMER   2,023,478
PROCESS FOR TREATING DOUGH PRODUCTS AND THE LIKE
Original Filed April 12, 1929
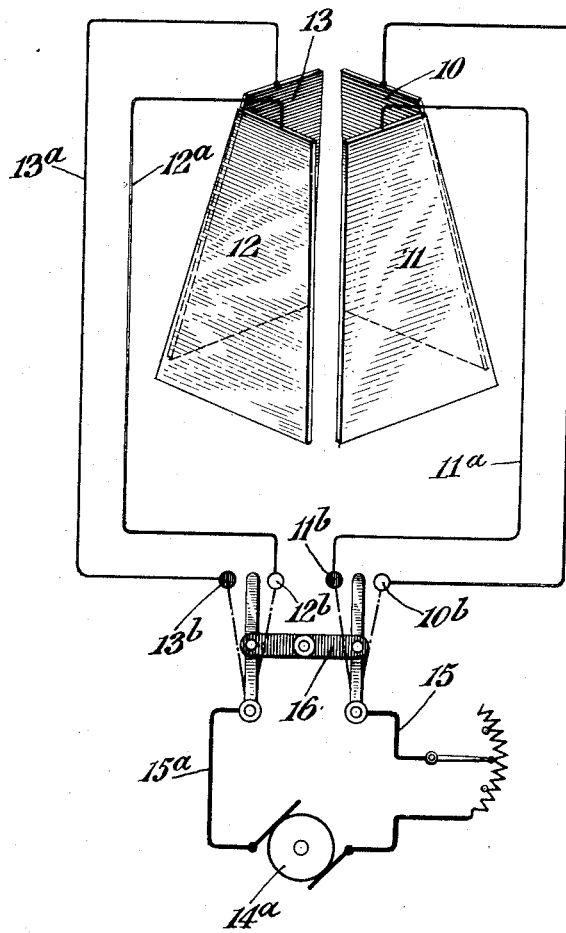
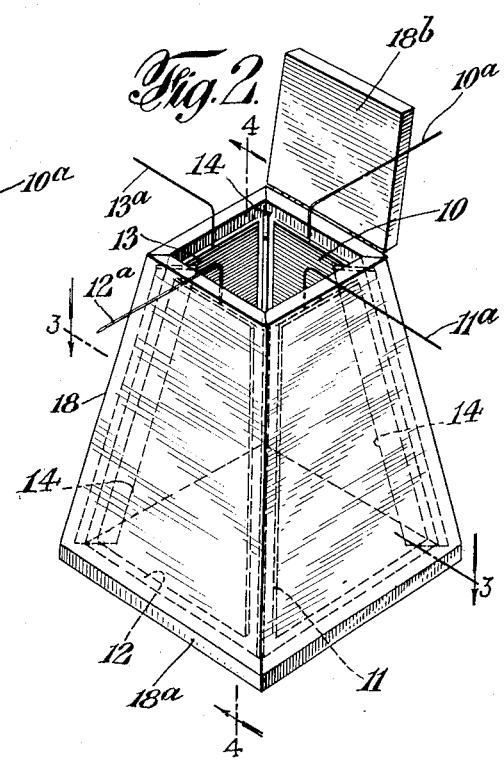
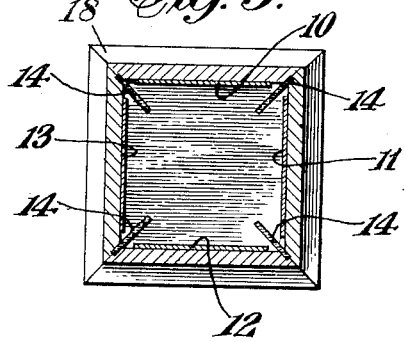
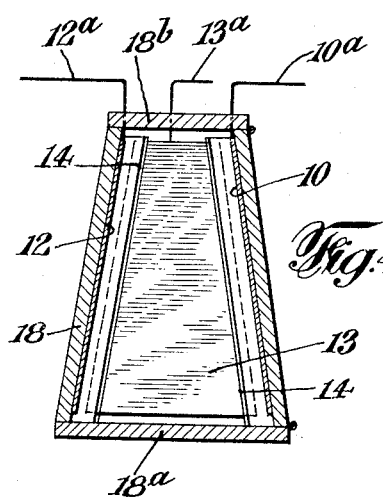
INVENTOR
John Kremer
BY
Conrad A. Dieterich
his ATTORNEY Patented Dec. 10, 1935

2,023,478

UNITED STATES PATENT OFFICE 2,023,478

PROCESS FOR TREATING DOUGH PRODUCTS AND THE LIKE

John Kremer, Southport, Conn.

Application April 12, 1929, Serial No. 354,467
Renewed August 19, 1933

24 Claims. (Cl. 107—54)

My invention relates to the making or treating of alimentary dough products of various kinds, and the same has for its object more particularly to provide a novel method for treating a mass of dough, or of dough combined with other substances, or for re-treating such products by subjecting the same to the action of electric current.

Further, said invention has for its object to provide a method of the character specified which results in the formation of a product without the necessity of the prior formation of the usual crust.

Further, said invention has for its object to provide a method of the character specified in which the alimentary dough product is treated by causing the same to be traversed by currents which pass through the material along different paths or also a plurality of paths to prevent the drying of the mass more along one cross-section or portion thereof than another, whereby to insure substantially uniform conversion thereof into the final product.

Further, said invention has for its object to provide a method of the character specified in which the moisture content of the mass of dough is controlled until sufficient heat may be supplied during the heating operation to effect the physico-chemical changes characteristic of baking.

Other objects will in part be obvious, and in part be pointed out hereinafter.

To the attainment of the aforesaid objects and ends, my invention consists in the successive steps of the method hereinafter more fully described, and then pointed out in the claims:

In the accompanying drawing—

Figure 1 is a diagrammatic view showing the essential parts for a method carrying the invention into effect;

Fig. 2 is a perspective view showing one form of container or frame used in carrying out the invention, Fig. 3 is a cross section on the line 3—3 of Fig. 2, and Fig. 4 is a section on the line 4—4 of Fig. 2.

In said diagram 10, 11, 12, and 13 represents four vertically arranged plates of uniform size made of aluminum, carbon, or other suitable conducting material, and with the edges separated and preferably insulated from each other, by relatively thin members or baffles 14 formed of glass, mica, paper, or other suitable insulating material and disposed angularly between the adjacent edges of said electrodes. The said members or baffles 14 are maintained in position by grooves provided in the inner walls or sides of the container or frame 18, and serve further to direct the current along certain lines of flow and to reduce the current density at the electrodes. From each plate extends a conductor 10a, 11a, 12a, and 13a, whose outer ends are connected to contacts 10b, 11b, 12b, and 13b. An alternating current or other generator 14a has one terminal 15 connected to one end of a movable switch or circuit closing device 16, adapted to be actuated by any suitable means, and its other terminal 15a also connected to the switch or circuit closing device 16.

In order to make the bread the mass of dough is disposed within a frame or container 18, composed of refractory or insulating material or of any other suitable material lined with insulating material. The said frame or container may be open at its top and bottom, and may be provided with a hinged base and cover portions 18a, 18b, respectively. The frame or container is preferably formed with upwardly tapering sides in order to facilitate the ready withdrawal of the finished product from the bottom of the frame or container.

The plates 10, 11, 12, 13 are disposed within the frame or container in separated relation against the inner walls or sides thereof. In order to improve the contact between the dough and the inner sides of the plates 10, 11, 12 and 13, the latter, for example may be coated or treated with a mixture of fatty matter and salt water, or with any other suitable conducting medium such as a paste consisting of vinegar or other conducting substance mixed with sugar, starch or other appropriate paste forming substance. By covering the inner surfaces of the plates 10, 11, 12, and 13 with the fatty solution containing salt two objects are accomplished, viz: (a) the dough or baked product is protected against straining or contamination from the electrodes or products of electrolysis, and (b) the bread or other product is prevented from adhering to the plates, and thus rendered more readily removable therefrom.

A current of high voltage for quick baking, (lower for slow baking) is caused to pass, for example, from the plate 10 to the plate 12 by way of contacts 10b and 12b, and conductors 10a and 12a, and thence after a brief interval the circuit closing device is actuated, and the current caused to flow from the generator 14 by way of the conductors 15 and 15a to the switch or circuit closing device 16 to the contacts 11b and 13b, conductors 11a and 13a, and caused to pass through the dough from the plate 11 to the plate 13. Variation in line of flow or shift of axis of the current is caused by shifting the switch 16, and the variation in line of flow of current is continued during the entire period of time that the bread is subjected thereto. To insure uniform baking each voltage should be proportional to distance between the electrodes.

The drying of cross-sections or portions of the dough mass traversed by greater current to a greater extent than cross sections or portions traversed by smaller current makes it desirable to heat materials that owe their conducting qualities to the content of their vaporizable substance, such as water, by the flow of current alternately along two orthogonal axes.

The formation of "critical sections" i. e., total cross sections which are drier than others, however, occurs only after an interval. If the current is permitted to flow at a great intensity for a short time only to supply the requisite heat it need not change in direction as no critical section will have time to form. For instance, a current of 5,000 amperes may be passed through the mass of dough for a tenth of a second instead of a current of 32 amperes for 40 minutes to produce substantially the same amount of heat.

The dough may be converted into the final product by the heat released by the passage of the electric current whether direct or alternating, or currents caused by electro-magnetic induction.

Electro-magnetic induction has the advantage that no contacts are needed, but requires the release of energy outside of the dough for field excitation. This field may be rotated to vary the path of the current through the dough. The use of electrodes is preferable and very efficient, because the current can be caused to flow substantially through all portions of the dough, although they can be directed to the outer portions, if desirable.

It is desirable that the current flow through the dough substantially equally along othogonal axes. The changes in path of current can be obtained by passing it, as above described, at times through one set of electrodes, and then through another set, i. e., three or more stationary electrodes applied to the surfaces of the dough. A good arrangement of electrodes it has been found, is to place, as above described, four electrodes on the four vertical surfaces of a cube of dough and energize opposite pairs of electrodes in turn.

The electrodes employed may be either fixed or arranged to yield as the bread rises or changes in volume. In this way expansion of the bread may take place along both vertical and horizontal axes, although satisfactory results can be obtained by expansion along one axis only as in the ordinary baking of bread.

For causing the shifting of current paths through the dough where single phase alternating current is employed a connection superimposing a displaced harmonic voltage can be imposed in the circuit so that the amount of current passing between one set of electrodes as compared with the current passing between the other set of electrodes, one electrode being common to both sets, will vary with time in the course of a cycle and the formation of critical sections in the inter-electrode material will be discouraged. There are two ways in which the single phase three electrode arrangement above mentioned will function to prevent the formation of critical sections. If the geometrical disposition of electrodes is essentially equilateral-triangular, and if there is an inductive or capacitative phase displacement in the circuits, or any one of them as compared to the others, there will be a shifting of the resultant current path through the mass of dough to prevent the formation of critical sections. In the use of such currents the inductances are a few turns, and the condenser elements are very simple, the frequency of the currents being extremely high, often as high as 1000 kilocycles per second. Another way in which the three electrode single phase apparatus would heat without the formation of a critical section would be if the system for one set of electrodes functions as a half-wave rectifier. The purpose of the above described arrangements is to cause the current as it passes through the material to vary the angle at which the lines of flow pass across any section of the material so as to prevent the formation of critical sections.

The cross section of the bread dough could be of reduced area at one part so that a critical section is intentionally made to form, or high resistance material could be inserted through a cross section, or a part thereof to cause a critical section to form.

In some instances it may be preferable to apply the energy momentarily (a few seconds or less than a second), and allow the bread to cook, for example, one half hour, in its own heat. The energy may be applied repeatedly in brief stages widely separated in point of time. This prevents the yeast being killed and allows the bread to rise by the action of the yeast in the pressure of the heat generated by the initial application of current, as it could not do if the temperature were raised to the boiling point of water.

The foregoing method provides between heating stages the time necessary for preventing the formation of, or the curing of critical sections by a diffusion process in which the moisture present in the less dry portions of the material diffuses through the drier portions thereof, and again equalizes the distribution of moisture throughout the mass. This permits of better equalization of the current density along the various paths of the current between the electrodes. Furthermore, by reducing the instantaneous energy input the current can be reduced and its efficiency energetically and economically increased. It is sometimes advisable to conduct the electric heating in a closed insulated space maintained at about 212° F. In some instances it may be desirable to promote evaporation, and in other instances to retard the same. When polyphase currents are used on a standard dough (which is moist), then evaporation should be promoted to attain final dryness as quickly as possible with the minimum energy expenditure. In other instances, the formation of critical sections may be prevented by retarding evaporation.

The time necessary to effect the baking of the bread or other similar product may be accelerated or retarded by controlling the escape of moisture from the dough. By venting the dough by suitable means the escape of moisture will be facilitated, and if an initially moist dough is used it may be more quickly reduced to the desired dryness. The smaller the unit or article undergoing conversion the quicker the same dries. By conducting the baking operation in a moist atmosphere drying may also be retarded.

Care should be taken that the electrical internal resistance heating does not result in the drying out of the material so rapidly that it is nearly completely dry before the physico-chemical changes necessary for the production of bread can occur.

The electrodes and the strength of current employed, which depends on size of material and initial moisture content, should be adjusted so that there will be no overheating at the electrodes. If the material starts to char, the current must be cut off at the first appearance of charring, and the apparatus and current readjusted, otherwise a filament of char will bridge the gap between the electrodes, or it will stretch from the vicinity of one contiguous electrode to the vicinity of the opposite one. Most of the current will flow in the charred filament which will tend to broaden. The tendency to char may be reduced by keeping the electrodes moist. This may be arranged for by preventing the escape of moisture by putting the electrodes at the bottom of non-conducting cups, or by superadding moisture from an external source, or by keeping the current density so low that at the electrodes the heated material will remain moist until after the rest of the material is finished or baked.

Owing to the fact that the contained moisture in the material tends to distribute itself uniformly throughout the cross-section—that is, there is a low moisture gradient—an increase in cross-section results in slower drying of the outer as well as the inner portions of the cross-section, and allows more time for the physico-chemical changes to take place.

The nature or structure of the material may also be changed so as to make it more resistant to the escape of moisture or more hygroscopic, as desired, with the idea of delaying the drying of the material until it is converted into the desired substance. If the material is a bread, butter or other fat, milk or other fat containing substances may be added or incorporated to make it more resistant to the escape of water. In order to make the material more hygroscopic, that, is to give the material a greater affinity for water, honey, sugar, syrups, and the like may be used. One of the best methods is to employ raisins which readily absorb water in which they have been soaked.

Drying may be retarded by reducing the difference in moisture between the material being heated and the immediate surroundings. The rate of evaporation from the surface is proportional to the vapor pressure difference between the water in or on the surface of the material and that in the gas in contact with it. Humidification of air on a large scale could be employed to prevent the too rapid drying of material being heated by internal electrical resistance. But if the water vapor that escapes from the material being heated in the early stages is prevented from leaving the vicinity and caused to remain in the gas phase and in contact with the material, then evaporation will be slowed down. This may be brought about by conducting the heating operation in a closed chamber or vessel through which heat cannot pass too readily. By controlling the escape of heat and moisture from such a chamber or vessel the rate of drying may be made as slow as desired, that is, slow enough to allow of the complete conversion of the original material into the desired substance-baked bread.

The function of such closed chamber is similar to that of the usual crust on bread, in that it prevents the escape of heat and moisture from the interior of the loaf. But unlike the crust on bread it does not interfere with the flow of energy to the interior of the loaf. The chamber may be large like a furnace or an oven or it may be close-fitting and slightly pervious like the crust on bread. If it is close-fitting it must have an electrical non-conducting surface, and such enclosure or the electrodes themselves may be provided with proper means for the escape of moisture at a proper rate. The size of the opening of such venting means may, if desirable, be varied during the conversion process. For retarding drying action the receptacle or electrodes may be provided with water supplying means. The chamber may be made of a phenolic condensation product—bakelite-porcelain or enameled metal, and be provided with a hinged cover for convenience in inserting the raw material and removing the finished product therefrom.

In continuous processes where roller or sliding electrodes are used or where relatively stationary electrodes are used, drying can be controlled by adjusting the humidity of the room or chamber in which the process is being carried on.

The composition of the material may be made such that it will lose water very slowly, and so permit of complete conversion—baking—before it becomes dried out. Another method of prolonging the drying period until the desired physical and chemical changes have occurred is to apply the electric energy slowly, a small current being allowed to flow for a long time. That is, the current could be reduced after the material is heated to a suitable degree, which may be about the boiling point of water, and then kept just strong enough to prevent cooling of the material. The use of alternating current will avoid the very rapid drying because it does not remove water by electrical endosmosis like direct current does.

Instead of providing an artificial crust as by a chamber of close-fitting baking shell a real crust may be put on the material by means of flame or ordinary heating or by electrode action or by internal resistance heating, the interior of the mass being then heated by electrical restistance as above described.

Electrical internal resistance heating may be advantageously employed for baking biscuits or dough products where drying under any system of baking must be very rapid, and where cooking must either be equally rapid or take place subsequent to drying. After the material had been heated and dried by electrical internal resistance heat it could be remoistened by water sprayed on its surface or into its interior through perforated tubes, which would be withdrawn at the end of the process.

Heating and temperature rise at an electrode is proportional to the time integral of the current squared times the resistance at the electrode. Local temperature rise is less if heat is lost by conduction or radiation. Such temperature rise is greater if the current flows from the electrode to the material to be heated from a small area rather than a large one.

It is desirable to keep the temperature at the electrodes low because high temperature at such electrodes may cause damage to the electrodes or to the material, or may cause charring and may set a limit on the usefulness of the electric internal resistance process. If the current is such that charring tends to occur it increases the contact resistance and makes the electrical energy expense greater.

Contact may be made by using pools of conducting liquid into which the ends of the material to be heated by electrical internal resistance can dip.

Flexible metallic electrodes, screens, strips, tinsel, metal cloth, or any fibrous material such as canvas saturated or moistened with salt water, vinegar or other suitable electrolyte and interposed between the electrodes and dough may be used to secure contact with solid or semi-solid material, and if a constant pressure is maintained uniformly on the electrodes very fair contact will be made. Each electrode may be made up of a number of independently acting pistons, plates or pieces of metal, or compressed carbon each of which presses against the material to be internally heated with a force independent of the shrinking or swelling of the material. Electrolysis will take place at the electrodes even when alternating current is used. Ducts or spaces may be left for the escape of the resulting gas when stationary electrodes are used.

Where bread is to be used for sandwiches immediately after being baked the presence of a crust is a disadvantage as it has to be removed and wasted. But where bread is to be used sometime after baking crust protects the surface from rapid evaporation and is desirable. However, bread made electrically without crust and wrapped in paper to protect it, as crust does, represents an advance in the art of baking. Such a paper covering would serve the purpose of the present commonly used wax wrappings, but unlike these might adhere tightly to the surface of the bread, from which it could be pulled or peeled off. In order to maintain the proper humidity during the baking itself this paper might be used.

Bread made by a continuous process, that is where the loaf or bar is heated wholly or in part by electric current flowing between roller or tractor tread electrodes, or relatively stationary electrodes, may be given a crust or not, as desired. Electrode burning is not a factor in the first two instances named because there is relative motion of the electrode and the dough. Heat substantially uniformly applied through electric currents as contrasted with the crusting heat of a furnace permits of simultaneous expansion and cooking of all portions of the mass of dough so that every part may be subjected to ideal time temperature cycle which could only be given to limited portions of the dough in an oven baked loaf, and the time required for effecting the baking need be no longer than that which is necessary to cause the necessary changes to take place. This results in the production of high quality products irrespective of the size of the mass thereof in less time than that required in ordinary baking. Appreciable saving in energy is possible because the dough is heated by the passage of current through it without appreciable loss of heat instead of being heated by radiation or by contact with hot gases, the heat from which is largely dissipated or lost, or reaches the interior of the dough with difficulty because the material is a very poor thermal conductor. In this process the time required for the production of the finished product is substantially independent of the size of the product to be formed. Combinations, either simultaneous or successive, of internal resistance heat and crusting heat may be employed as desirable.

The use of carbon for the electrodes is preferable if salt grease is used because carbon is not affected by electrolysis directly while aluminum is. If aluminum or other metals liable to form toxic compounds are used, it is preferable to separate the same from the dough by paper or other similar porous material moistened in salt water or in salt water and grease to prevent contamination and sticking and to moisten the outer surface or skin of the dough to improve the conductivity at the juncture of the electrodes with the dough, or the aluminum or other metallic electrode may be coated with a carbonized or oxide surface, and the latter with the salt grease forming a good electrode combination.

It is to be noted that any number of sets of electrodes may be employed where the dough mass is maintained stationary, and two will be sufficient if the moisture content of the mass be properly controlled as hereinabove pointed out. Where the dough mass is movably disposed and shifted periodically, the same result may be attained by the use of stationary electrodes. Further, satisfactory results may be obtained by the use of one stationary electrode in combination with an electrode which is movably arranged relative thereto.

Further it is to be noted that the electrical contact between the electrodes and dough mass may be improved or rendered more positive by providing the electrodes with projections, loops, springs or other means serving to produce extended surfaces of contact.

Further, it is to be noted that bread dough and the like may be preliminarily warmed by the electrical generation of heat therein in order to cause the same to rise preparatory to making the same.

The present method may be employed for making bread, or the like, whether leavened or unleavened, for toasting the same or reheating the same or for making products in which dough is incorporated with other food products.

The terms "electric current" and "current" as used in the specification and claims are not to be construed in a limited sense, but broadly as defining electric energy whether the same be the result of the direct application of current to the mass operated upon, or the result of induced currents or waves.

Having described my invention what I claim and desire to secure by Letters Patent is:

1. The hereindescribed method of treating dough products which consists in subjecting a mass of the material to the action of electric current controlling the current to prevent the formation of a critical section and utilizing the heat generated due to the resistance of said mass for effecting the desired change therein, substantially as specified.

2. The hereindescribed method of treating dough products which consists in passing current through a mass of dough, changing the path of current flow through said mass to prevent the formation of a critical section, and utilizing the heat generated due to the resistance of the mass for effecting the desired change therein, substantially as specified.

3. The hereindescribed method of making dough products which consists in passing current through a mass of dough, controlling the current to prevent formation of a critical section, utilizing the heat generated due to the resistance thereof for effecting change therein, and controlling the moisture content of the mass during the heating thereof, substantially as specified.

4. The hereindescribed method of making dough products which consists in passing current in successive intersecting paths through a mass of dough, and utilizing the heat generated due to the resistance of the dough for effecting the baking thereof, substantially as specified.

5. The hereindescribed method of making dough products which consists in passing current through a mass of dough for a time interval less than the predetermined time for completion of the product, and thereby heating the same throughout the mass thereof, and completing the cooking of the product by the retained heat of the product, substantially as specified.

6. The hereindescribed method of making dough products which consists in passing current along orthogonal axes through a mass of dough and thereby heating the same throughout the mass thereof, substantially as specified.

7. The hereindescribed method of making dough products which consists in passing current in successive intersecting paths through a mass of moist dough, and thereby heating the same substantially uniformly through the mass thereof substantially simultaneous with the passage of current therethrough, substantially as specified.

8. The hereindescribed method of making dough products which consists in passing current of low density at the electrodes through a mass of dough whereby charring is prevented, and thereby suppling heat thereto throughout the mass in a quantity sufficient to bake the same, and forming a crust on the converted product, substantially as specified.

9. The hereindescribed method of making dough products which consists in passing current through a mass of dough, and thereby converting the same by the heat generated by the current, and then subjecting the exterior of the baked product to heat for forming a crust, substantially as specified.

10. The hereindescribed method of making dough products which consists in placing a mass of moist dough between electrodes, and passing current in interrupted intervals through said dough between said electrodes whereby to cure by diffusion such critical sections as may form and utilizing the heat generated by passage of the current for making the product, substantially as specified.

11. The hereindescribed method of making dough products which consists in placing a mass of moist dough between a plurality of sets of electrodes, and passing current through said dough over different paths between the electrodes of said sets, and effecting the conversion of the mass by the heat generated by the current, substantially as specified.

12. The hereindescribed method of making dough products which consists in placing a mass of moist dough between a plurality of sets of electrodes, and passing current through said dough over different paths between certain of said sets of electrodes and then between the other thereof, and utilizing the heat generated by said current for converting the mass substantially uniformly throughout the extent thereof, substantially as specified.

13. The hereindescribed method of making dough products which consists in subjecting the dough to electric current during a part of the conversion step, and utilizing the heat generated by the momentary passage of current to subsequently complete the conversion of the product, substantially as specified.

14. The hereindescribed method of making dough products which consists in applying electrodes to the dough product, coating the electrodes to prevent contamination and sticking of the electrodes to the product, passing current through said dough between said electrodes, and utilizing the heat generated for converting the dough into the product, substantially as specified.

15. The hereindescribed method of making dough products which consists in treating a mass of the unraised dough material to the action of an electric current of sufficient amperage to cause the dough to raise without deleteriously affecting the yeast and to effect the conversion of said dough into a baked product by the heat generated in the mass due to the resistance thereof.

16. The hereindescribed method of making dough products which consists in passing electrical current substantially uniformly throughout a mass of material the amperage of the current being insufficient to raise the temperature of the material above the boiling point temperature of water, and utilizing the heat generated due to the resistance of the mass for effecting the desired physico-chemical change therein and producing a baked product of substantially homogeneous texture.

17. The hereindescribed method of making dough products which consists in passing current through a mass of dough in intersecting alternate paths to effect substantially uniform heating of the mass due to the resistance thereof, and continuing the heating until conversion of the mass into a baked product of substantially uniform texture is effected.

18. The hereindescribed method of making dough products which consists in passing current through a mass of dough in different directions to uniformly heat the same while controlling the moisture content to prevent drying of the mass during the converting operation, and continuing the operation until a baked product is obtained of substantially uniform texture.

19. The hereindescribed method of making dough products which consists in causing electric current to traverse the mass of dough so as to cause the generation of heat within the mass uniformly throughout the same without the formation of critical sections, and thereby converting the mass into a product of substantially uniform texture.

20. The hereindescribed method of making dough products which consists in causing electric current to traverse the mass of dough over paths changing in angular relation, and thereby generating heat within the mass to effect the conversion thereof.

21. The hereindescribed method of making dough products which consists in placing a mass of dough between a plurality of sets of electrodes arranged in angular relation to each other, causing current to traverse the mass over the angularly related paths between the electrodes of said sets, and effecting the conversion of the mass by the heat generated by the current.

22. The hereindescribed method of making dough products which consists in causing electric current to momentarily traverse moist dough substantially uniformly throughout the mass thereof, and thereby generating within the mass the heat necessary for the conversion of the dough substantially instantaneously to prevent the formation of critical sections therein.

23. The hereindescribed method of making dough products which consists in initially causing the dough to rise by the action of electric current generating heat therein, and continuing the application of current for effecting the conversion of said dough into a baked product by heat generated by said current.

24. The hereindescribed method of making dough products which consists in initially subjecting the dough to the heating action of electric current to cause the dough to rise in the presence of yeast without deleteriously affecting the yeast, and continuing subjecting the mass to the action of a current of sufficient intensity to effect the conversion of said dough into a baked product by the heat generated in the mass.

JOHN KREMER.

CERTIFICATE OF CORRECTION.

Patent No. 2,023,478.                                    December 10, 1935.

JOHN KREMER.

It is hereby certified that error appears in the printed specification of the above numbered patent requiring correction as follows: Page 4, second column, lines 60-61 and 68-69, claims 1 and 2 respectively; page 5, first column, lines 2, 8, 16, 21, 28, 35-36, 42-43, 51-52, 59-60 and 69-70, claims 3, 4, 5, 6, 7, 8, 9, 10, 11 and 12 respectively; and second column, lines 2 and 10, claims 13 and 14 respectively, strike out the comma and words ", substantially as specified"; and that the said Letters Patent should be read with these corrections therein that the same may conform to the record of the case in the Patent Office.

Signed and sealed this 14th day of April, A. D. 1936.

(Seal)

Leslie Frazer
Acting Commissioner of Patents.